United States Patent

Ditka et al.

[11] Patent Number: 5,867,958
[45] Date of Patent: *Feb. 9, 1999

[54] EASY DRIVE CONCRETE FASTENER SYSTEM

[75] Inventors: Michael P. Ditka, Deerfield, Ill.; Larry Reinhard, Arvada, Colo.

[73] Assignee: Illinois Tool Works Inc., Glenview, Ill.

[*] Notice: The term of this patent shall not extend beyond the expiration date of Pat. No. 5,661,938.

[21] Appl. No.: 898,848

[22] Filed: Jul. 25, 1997

Related U.S. Application Data

[63] Continuation of Ser. No. 595,742, Feb. 2, 1996, Pat. No. 5,661,938.
[51] Int. Cl.$^6$ .................................................. E04B 7/00
[52] U.S. Cl. ........................ 52/410; 52/512; 52/506.05; 411/452; 411/533
[58] Field of Search ........................ 52/410, 408, 506.05, 52/512; 411/452, 453, 489, 533

[56] References Cited

U.S. PATENT DOCUMENTS

| | | |
|---|---|---|
| Re. 28,227 | 11/1974 | Elders . |
| 63,738 | 4/1867 | Merlett . |
| 148,721 | 3/1874 | Lowensohn . |
| 186,904 | 1/1877 | Vanstone et al. . |
| 276,541 | 4/1883 | Sloan . |
| 364,000 | 6/1887 | Rogers . |
| 364,301 | 6/1887 | Rogers . |
| 364,302 | 6/1887 | Rogers . |
| 456,723 | 7/1891 | Harvey . |
| 510,035 | 12/1893 | Lipe . |
| 1,168,088 | 1/1916 | Makley . |
| 1,380,423 | 6/1921 | Sessler . |
| 1,698,951 | 1/1929 | Holmes . |
| 1,816,162 | 7/1931 | Tolman, Jr. . |
| 1,897,335 | 2/1933 | Riedel et al. . |
| 2,001,869 | 5/1935 | Deniston, Jr. . |

(List continued on next page.)

FOREIGN PATENT DOCUMENTS

| | | |
|---|---|---|
| 0436 830 | 7/1991 | European Pat. Off. . |
| 870182 | 3/1942 | France . |
| 629772 | 9/1949 | United Kingdom . |
| WO 93/23677 | 11/1993 | WIPO . |

*Primary Examiner*—Robert Canfield
*Attorney, Agent, or Firm*—Schwartz & Weinrieb

[57] ABSTRACT

A depth-insensitive concrete fastener system is provided for securing roofing insulation materials to concrete roofing or decking. The concrete roofing or decking substructure is provided with a pre-drilled hole or bore having a predetermined diametrical extent. An anchor bolt fastener comprises a head portion, a pointed tip portion, and a shank portion interconnecting the head and tip portions. The shank portion has a first relatively smooth shank portion disposed adjacent to the head portion and extending toward the tip portion, and a second ribbed portion disposed adjacent to the tip portion and having an axial extent which is only a fractional portion of the entire axial extent of the fastener. The diametrical extent of the first smooth shank portion is less than that of the pre-drilled hole or bore defined within the concrete substructure, whereas the diametrical extent of the second ribbed shank portion is greater than the diametrical extent of the pre-drilled hole or bore defined within the concrete substructure. Therefore, when the anchor bolt fastener is impactly driven into the pre-drilled hole or bore of the concrete substructure, an interference or friction fit is defined between the anchor bolt fastener and interior sidewalls of the concrete substructure defining the pre-drilled hole or bore only along the axial extent of the second ribbed shank portion of the bolt fastener. Consequently, the fastener system is rendered depth-insensitive in that regardless of the depth to which the anchor bolt fastener is driven into the concrete substructure, the installation force does not increase beyond a predetermined limit. A roofing washer element may be pre-assembled upon the anchor bolt fastener as a result of being captured between the head and second ribbed shank portions of the bolt fastener.

22 Claims, 5 Drawing Sheets

U.S. PATENT DOCUMENTS

| | | |
|---|---|---|
| 2,014,746 | 9/1935 | Robergel . |
| 2,075,411 | 3/1937 | Von Mertens . |
| 2,226,006 | 12/1940 | Maze . |
| 2,256,401 | 9/1941 | Maze . |
| 3,106,791 | 10/1963 | Ball . |
| 3,133,378 | 5/1964 | Poupitch . |
| 3,850,073 | 11/1974 | Hayes . |
| 4,161,854 | 7/1979 | Stelzer . |
| 4,350,464 | 9/1982 | Brothers . |
| 4,361,997 | 12/1982 | DeCaro . |
| 4,380,413 | 4/1983 | Dewey . |
| 4,453,361 | 6/1984 | Hulsey . |
| 4,476,660 | 10/1984 | Francovitch . |
| 4,516,371 | 5/1985 | Simpson . |
| 4,572,720 | 2/1986 | Rockenfeller et al. . |
| 4,726,164 | 2/1988 | Reinwall et al. . |
| 4,763,456 | 8/1988 | Giannuzzi . |
| 4,780,039 | 10/1988 | Hartman . |
| 4,781,503 | 11/1988 | Bogel . |
| 4,860,513 | 8/1989 | Whitman . |
| 4,907,927 | 3/1990 | Choiniere . |
| 5,011,354 | 4/1991 | Brownlee . |
| 5,018,329 | 5/1991 | Hasan et al. . |
| 5,082,412 | 1/1992 | Thomas . |
| 5,118,235 | 6/1992 | Dill . |
| 5,329,738 | 7/1994 | Ovaert et al. . |
| 5,661,938 | 9/1997 | Ditka et al. ............................... 52/410 |

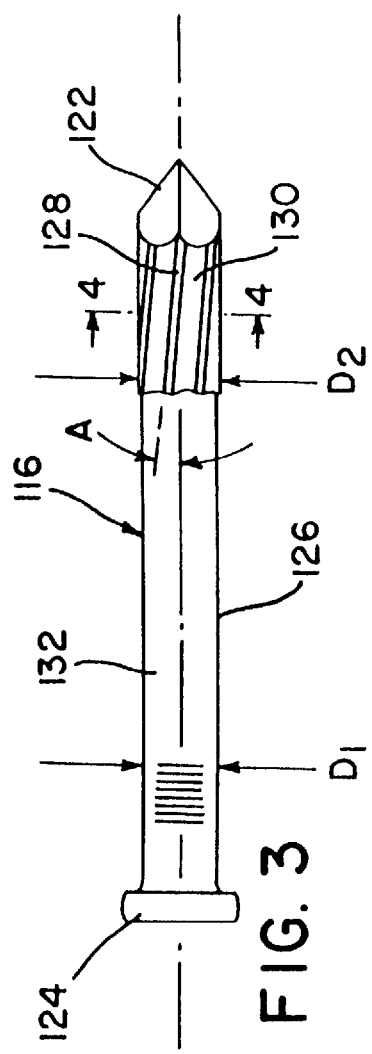
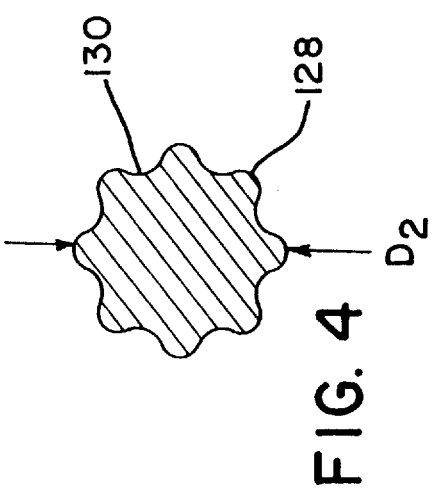
FIG. 3
FIG. 4

EASY DRIVE CONCRETE FASTENER SYSTEM

This patent application is a Continuation patent application of prior patent application Ser. No. 08/595,742 filed Feb. 2, 1996, now U.S. Pat. No. 5,661,938.

FIELD OF THE INVENTION

The present invention relates generally to fastener systems, and more particularly to a fastener system which is specifically adapted for use in connection with fastening or securing roofing membranes or insulation materials to concrete decking.

BACKGROUND OF THE INVENTION

Concrete anchor fastening systems for particular use in connection with concrete substrate structures, such as, for example, those systems for securing or fastening roofing insulation materials to concrete decking, are of course well known. One such well known fastening system comprises the STRIKER™ concrete anchor fastening system which has been developed and marketed by ITW BUILDEX, 1349 West Bryn Mawr, Itasca, Ill. 60143, a subsidiary of the assignee of record of the present patent application embodying the present invention. The STRIKER™ concrete anchor fastening system is disclosed within FIG. 1 and is generally indicated by the reference character 10. The STRIKER™ concrete anchor fastening system 10 is adapted to secure or fasten roofing materials, such as, for example, sheets of rigid roofing insulation 12 to a concrete substrate or substructure 14, and is seen to comprise a STRIKER™ concrete anchor 16 and a STRIKER™ plate 18 operatively associated therewith. The STRIKER™ plate 18 may optionally be fabricated as either a metal plate or a plastic plate.

In accordance with the recommended installation techniques to be employed in connection with the aforenoted prior art STRIKER™ concrete anchor fastening system 10, a standard or conventional rotary hammer drill is first used to drill a pilot hole through the insulation 12 and into the concrete substructure 14, the pilot hole having an axial depth which is at least one-quarter inch (¼") deeper than the final engagement depth of the concrete anchor 16 so as to accommodate, for example, debris from the drilling operation. STRIKER™ plate 18, along with the STRIKER™ concrete anchor 16 which may be pre-assembled therewith by insertion through a central aperture 20 thereof, is then positioned atop the rigid insulation 12 such that the concrete anchor 16 can be inserted into the drilled pilot hole. The STRIKER™ concrete anchor 16 can then be fully inserted through the rigid insulation 12 and into the concrete substructure 14 by means of a suitable hammer or other type of impact tool.

As can be seen from further reference to FIG. 1, the STRIKER™ concrete anchor 16 is of the type comprising a pointed tip portion 22, a head portion 24, and a body or shank portion 26. The body or shank portion 26 is provided with a circumferentially arranged series of substantially axially extending, alternating ribs and grooves 28, the ribs and grooves 28 preferably having a slight spiral or twisted orientation with respect to the longitudinal axis of the anchor 16. The outer diametrical extent of the ribs is greater than the corresponding diametrical extent of the pilot hole drilled within the rigid insulation 12 and concrete substructure 14 such that when the concrete anchor 16 is hammered into the concrete substrate or decking 14, a good interference fit is defined between the concrete anchor 16 and the annular surrounding wall surfaces of the concrete substructure defining the pilot hole drilled therein. This interference fit defined between the concrete anchor 16 and the surrounding walls of the pilot hole drilled within the concrete decking 14 serves to determine the retaining force or pull-out resistance characteristic of the concrete anchor 16. The retaining force or pull-out resistance characteristic of the concrete anchor 16 should of course be sufficient to prevent the concrete anchor 16 from becoming dislodged from the concrete decking 14 even, for example, s,under high wind conditions, which create large uplift force so as to in fact maintain the rigid insulation 12 affixed to the concrete decking 14.

While the aforenoted prior art STRIKER™ concrete anchor fastening system 10 has been extremely commercially successful, it has been realized that in view of the fact that the series of ribs and grooves 28 extend axially throughout substantially the entire axial length of the concrete anchor 16, that is, along substantially the entire axial length of the shank portion 26 defined between the tip portion 22 and the head portion 24, the STRIKER™ concrete anchor 16 is of the type which is characterized as depth-sensitive A depth-sensitive fastener exhibits driving characteristics wherein the driving or impact force required to install the anchor 16 within the pilot hole of the concrete decking 14 and rigid insulation 12 is directly proportional to the depth of embedment of the installed fastener, or in other words, the deeper the fastener is driven into the drilled pilot hole, the more difficult it is to install the STRIKER™ concrete anchor 16 because of the ever-increasing axial length of the plurality of ribs that encounter the sidewall portions of the concrete decking 14, defining the driller pilot hole and which define the aforenoted interference or friction fit with the ribs of anchor 16, as the anchor 16 is progressively axially inserted into the pilot hole.

In an effort to overcome the aforenoted installation difficulties attendant the prior art STRIKER™ anchor 16, depth-insensitive anchors have been developed. One such anchor is disclosed in U.S. Pat. No. 5,035,559 which issued to Martin J. Nilsen on Jul. 30, 1991 and is assigned to the assignee of record of this patent application. This particular type of anchor, however, is substantially different from the STRIKER™ anchor 16 in that in lieu of defining an interference or friction fit between the STRIKER™ anchor and the sidewalls of the concrete deck defining the drilled pilot hole as in the case of the system disclosed in FIG. 1, the concrete anchor disclosed in U.S. Pat. No. 5,035,559 is of the compression fit type in that the shank of the anchor of such patent undergoes bending and straightening deformations as the shank portions of the anchor, offset with respect to each other and with respect to the longitudinal axis of the anchor, encounter the sidewall portions 52 of the hole 50 defined within the body of concrete 54.

Another anchor for use within concrete or masonry, and of the interterference-fit type, is disclosed in U.S. Pat. No. 4,350,464 which issued to Richard L. Brothers on Sep. 21, 1982. This anchor, however, is not truly of the depth-insensitive type in view of the fact that the diameter of the shaft 13 of the anchor 10 has a diametrical extent which is substantially or essentially the same as that of the hole 101 formed within the concrete 100. In addition, the anchor of this patent is quite difficult and costly to manufacture in view of the need for the anchor shank portion to undergo bead line welding in order to provide the anchor 10 with the patterned weld bead lines 14.

A need therefore exists within the concrete fastener system art for a new and improved depth-insensitive concrete fastener system which employs a depth-insensitive concrete anchor of the interference or friction-fit type.

OBJECTS OF THE INVENTION

Accordingly, it is an object of the present invention to provide a new and improved depth-insensitive concrete fastener system.

Another object of the present invention is to provide a new and improved depth-insensitive concrete fastener system wherein the system comprises or incorporates therein a depth-insensitive concrete anchor device of the interference or friction-fit type.

Still another object of the present invention is to provide a new and improved depth-insensitive concrete fastener system wherein the system can be effectively utilized in connection with the fastening or securing of rigid insulation panels and membranes to concrete substrates which are preferably concrete decks.

Yet another object of the present invention is to provide a new and improved depth-insensitive concrete fastener system within which a depth-insensitive concrete anchor enables relatively easy installation within a concrete substrate or substructure and yet exhibits sufficiently great pull-out resistance so as to reliably retain rigid roofing insulation panels and membranes, for example, to concrete roof decking substrates or substructures.

A further object of the present invention is to provide a new and improved depth-insensitive concrete fastener system which incorporates therein the use of a concrete anchor which establishes an interference or friction-type fit, with the sidewalls of a concrete substrate or substructure defining a hole or bore within which the anchor is drivingly inserted, wherein the interference or friction fit only acts along a predetermined axial length of the anchor such that the anchor is effectively rendered depth-insensitive regardless of the depth to which the anchor is driven into the hole or bore defined within the concrete substrate or substructure.

A still further object of the present invention is to provide a new and improved depth-insensitive concrete fastener system which incorporates therewithin a concrete anchor which is relatively simple and inexpensive to manufacture.

SUMMARY OF THE INVENTION

The foregoing and other objects of the present invention are achieved through the provision of a new and improved depth-insensitive concrete fastener system which incorporates therein a depth-insensitive anchor bolt device. The anchor bolt device comprises a pointed tip portion, a head portion, and a shank portion extending axially between the pointed tip and head portions of the bolt fastener. The anchor bolt device is adapted to be impactly driven into a pre-drilled hole or bore provided within a concrete substrate or substructure, such as, for example, concrete decking, so as to fasten, for example, rigid roofing insulation materials to the concrete decking. The hole or bore pre-drilled into the concrete decking has a predetermined diametrical extent, and in accordance with the present invention fastener system, the depth-insensitive anchor bolt device has a first, relatively smooth shank portion, commencing immediately adjacent to the head portion of the bolt fastener and extending toward the pointed tip portion of the bolt fastener, which has a diametrical extent which is slightly less than that of the pre-drilled hole or bore defined within the concrete decking. In addition, a second shank portion, commencing at the termination of the first shank portion and terminating at the pointed tip portion of the bolt fastener, comprises a circumferential array of substantially axially extending ribs and alternating grooves which are integrally formed with and upon the shank portion of the bolt fastener. The outer diametrical extent of the second ribbed shank portion of the bolt fastener is greater than the predetermined diametrical extent of the hole or bore pre-drilled within the concrete decking and is also greater than the predetermined diametrical extent of the first shank portion of the bolt fastener. The axial extent of the second ribbed shank portion of the bolt fastener is substantially less than the corresponding axial length of the anchor bolt fastener and preferably has an axial extent which is only a fractional portion of the axial extent of the anchor bolt fastener.

In view of the foregoing, an interference or friction fit is only developed between the anchor bolt fastener and the sidewalls of the concrete decking defining the pre-drilled hole or bore along the axial extent of the second ribbed shank portion of the anchor bolt fastener. The specific length of the second ribbed shank portion of the anchor bolt fastener can of course be selectively varied in order to selectively or optimally control, limit, or minimize the installation force required to drivingly install the anchor bolt fastener within the pre-drilled hole or bore formed within the concrete decking while concomitantly selectively or optimally determining the pull-out resistance characteristics of the anchor bolt fastener. In lieu of the ribs of the second shank portion of the bolt fastener being truly axially oriented with respect to the longitudinal axis of the anchor bolt fastener, the ribs may be slightly skewed, twisted, sprialled, or otherwise similarly oriented with respect to the longitudinal axis of the bolt fastener, the primary requisite of the ribbed structure being the fact that the ribs are substantially axially oriented.

In accordance with a further feature of the present invention, the anchor bolt fastener may be pre-assembled with the striker or washer plate wherein the striker or washer plate is effectively retained upon the bolt fastener by being captured between the head portion of the bolt fastener and the circumferential array of ribs comprising the second ribbed shank portion of the bolt fastener.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 3 is a side elevational view of a depth-insensitive anchor bolt fastener constructed in accordance with the principles of the present invention and incorporated within the depthinsensitive concrete fastener system of the present invention;

FIG. 4 is a cross-sectional view of the depth-insensitive anchor bolt fastener of FIG. 3 as taken along the lines 4—4 of FIG. 3;

Figure 1:
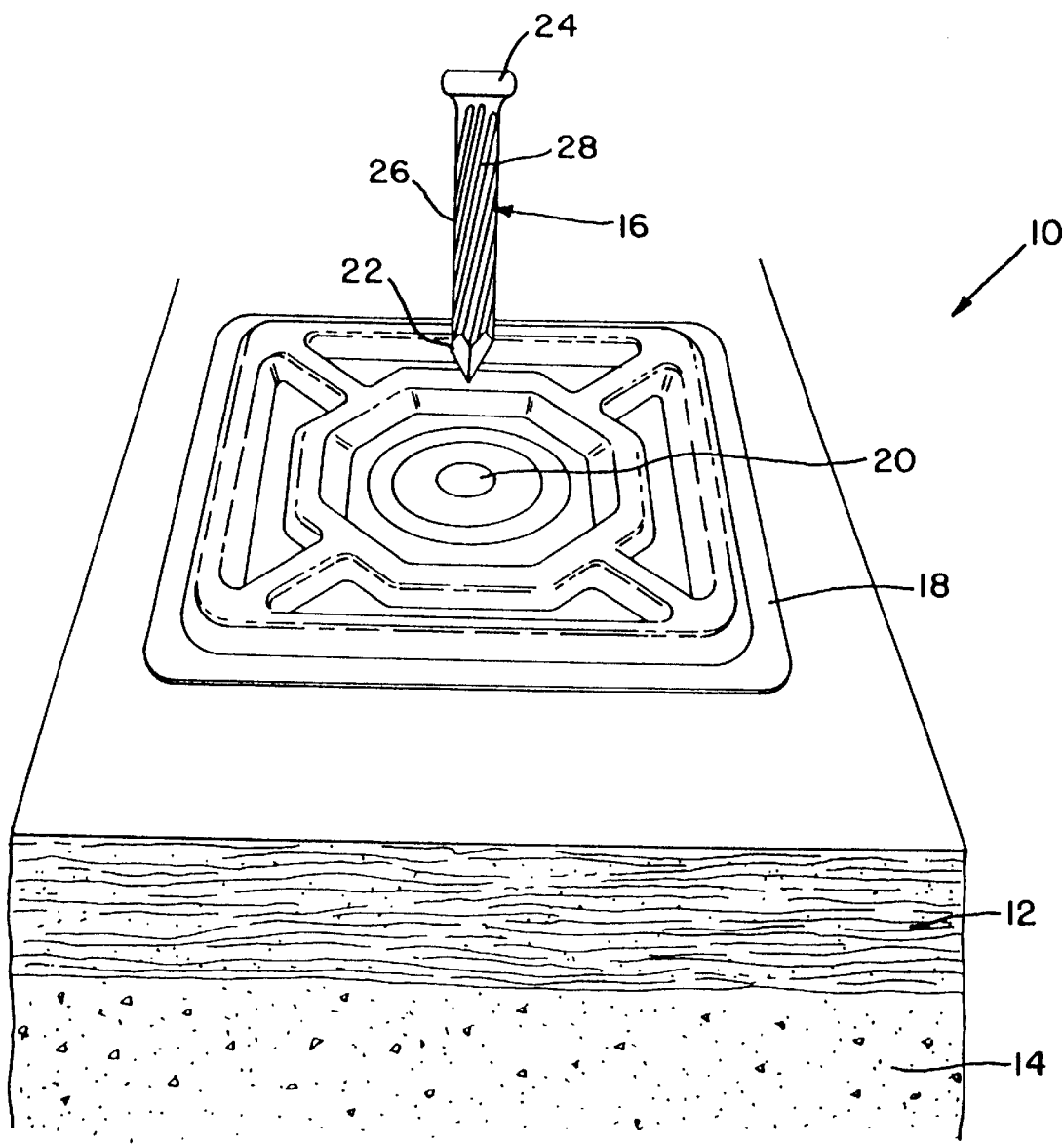
FIG. 1 is a perspective view of a PRIOR ART depth-sensitive concrete fastener system utilized for attaching roofing insulation materials underlying concrete decking substructures.
Figure 2:
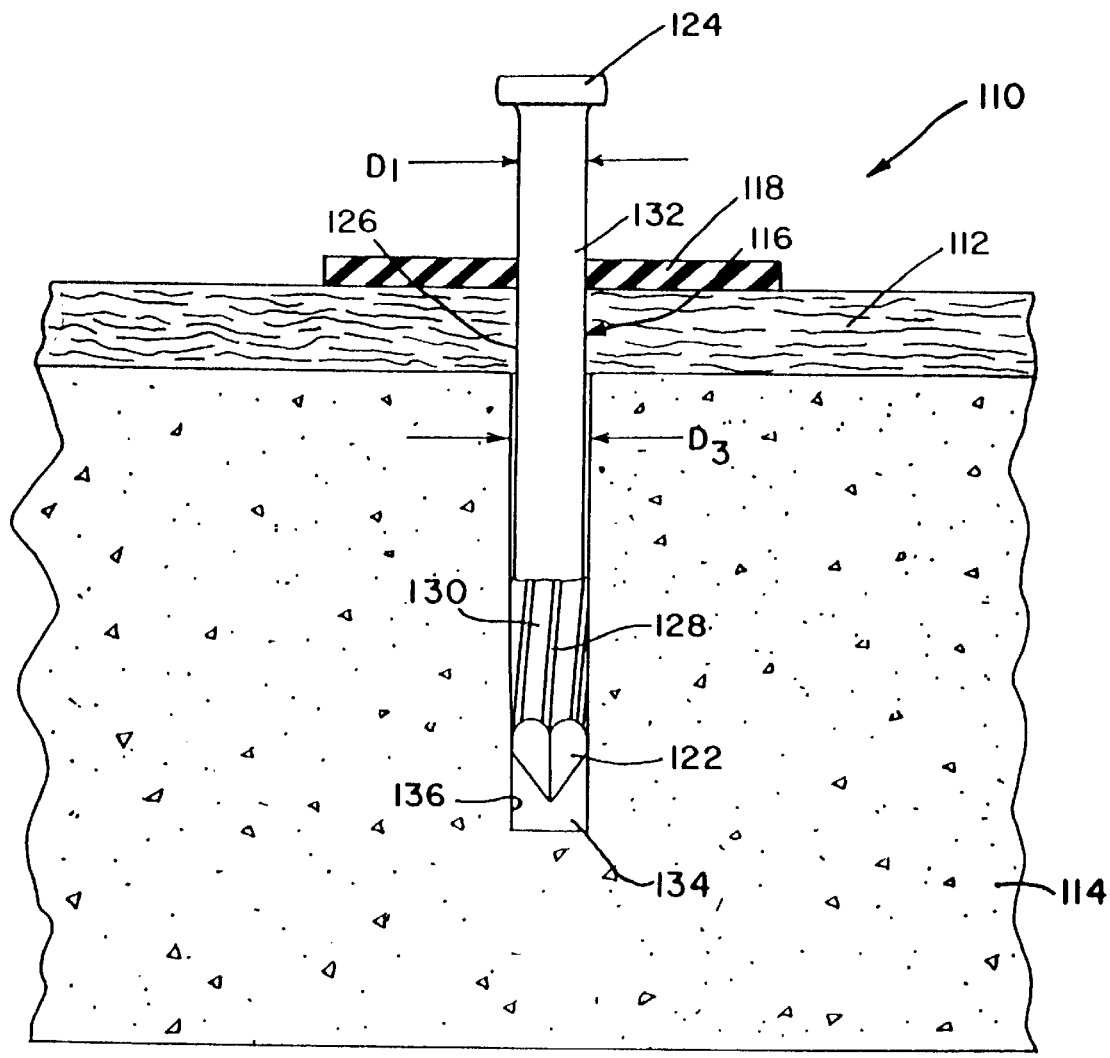
FIG. 2 a schematic view of the depth-insensitive concrete fastener system constructed in accordance with the principles of the present invention whereby roofing insulation materials may be secured or fastened to underlying concrete decking substructures, the roofing insulation material having been omitted from this view for the purposes of clarity.

DETAILED DESCRIPTION OF THE INVENTION:

Referring now to the drawings, and more particularly to FIG. 2 thereof, the new and improved depth-insensitive concrete fastener system, constructed in accordance with the principles of the present invention, is illustrated and generally indicated by the reference character 110. It is to be appreciated that the new and improved fastener system 110 of the present invention comprises a fastening system which is similar to that system 10 disclosed within FIG. 1 so as to secure or fasten, for example, a sheet of rigid roofing insulation material 112 to a concrete substrate or substructure, such as, for example, concrete decking 114. While the roofing insulation material has been shown schematically in the system of FIG. 2 simply for clarity purposes, it is to be understood that the sheet of insulation material is to be secured or fastened atop the concrete decking 114 in a manner similar to the disposition of the insulation material 12 with respect to the concrete decking 14 of the system 10 of FIG. 1, and in addition, a suitable roofing washer or washer plate, also shown schematically at 118 and, similar, for example, to the washer plate 18 of the system of FIG. 1, is preferably disposed atop the roofing insulation material. While a washer plate similar to the washer plate 18 of the system of FIG. 1, that is, wherein the plate is fabricated from metal and has a substantially square configuration, may be utilized within the system 110 of the present invention, other washer plates or roofing washers may be alternatively employed. One such type of alternative roofing washer or washer plate is disclosed within FIG. 5 at 118 and is seen to have a substantially circular configuration. This washer plate 118 is also fabricated from a suitable plastic material which is substantially rigid yet somewhat pliable or flexible, and is provided with a central aperture 120 through which a depth-insensitive anchor bolt device 116, characteristic of the present invention system, may pass so as to be drivingly inserted through the slab of roofing insulation material 112 and into the concrete decking 114.

With additional reference now also being made to FIGS. 3 and 4, it is seen that the depth-insensitive anchor bolt device 116 of the present invention system 110 is similar to the depth-sensitive anchor bolt device 16 of the PRIOR ART system 10 of FIG. 1 in that the anchor bolt 116 of the present invention comprises a pointed tip portion 122, a head portion 124, and a shank portion 126 extending between the pointed tip portion 122 and the head portion 124. Unlike the depth-sensitive anchor bolt device 16 of the PRIOR ART system 10 of FIG. 1, however, wherein the shank portion 26 of the anchor bolt device 16 is provided with its circumferentially arranged series of alternating ribs and grooves 28 which extend axially throughout substantially the entire axial length of the shank portion 26 of the anchor bolt device 16, the shank portion 126 of the anchor bolt device 116 of the present invention is seen to comprise a first, relatively smooth shank portion 132 which commences immediately adjacent to the head portion 124 and extends axially toward the pointed tip portion 122. In addition, a second shank portion, commencing at the termination of the first shank portion 132 and terminating at the pointed tip portion 122, comprises a circumferential array of substantially axially extending ribs 128 and alternating grooves 130, the ribs 128 and grooves 130 being integrally formed upon,and from the material comprising, the bolt device 116.

It is further appreciated that the relatively smooth, first shank portion 132 of the anchor bolt 116 has an external diametrical extent or dimension $D_1$, as noted in FIGS. 2 and 3, whereas the external diametrical extent or dimension of the second shank portion of the anchor bolt 116, as taken through or along a diametrical plane extending through the substantially axially extending ribs 128, has a predetermined value $D_2$ which is substantially greater than the diametrical extent or dimension $D_1$, as noted in FIG. 3 and 4. Consequently, when the depth-insensitive anchor bolt device 116 is to be drivingly impacted or similarly inserted into a concrete substrate or substructure 114, comprising, for example, concrete decking, so as to secure roofing insulation material 112 thereto, the concrete decking 114 is initially provided with a pre-drilled hole or bore 134 which has a diametrical extent or dimensional value $D_3$ which is slightly greater than the diametrical extent $D_1$ of the first, relatively smooth shank portion 132 of the anchor bolt device 116 but somewhat less than the external diametrical extent $D_2$ of the second ribbed shank portion 128 of the anchor bolt device 116. As a result of such interrelated structures comprising the bore or hole 134 of the concrete substrate 114, and the first and second shank portions 132 and 128 of the anchor bolt device 116, and appreciating the relative diametrical extents or dimensions of such structures, as the anchor bolt device 116 is driven into the hole or bore 134 of the concrete decking 114, an interference or friction fit is defined between the interior sidewall portions 136, of the concrete decking 114 defining the hole or bore 134, and the anchor bolt device 116 only along the axial extent of the second ribbed shank portion 128. This definition or development of the inference or friction fit only along or throughout the axial extent of the second ribbed shank portion 128 of the anchor bolt device 116 is precisely the feature which renders the present invention fastener system 110 depth-insensitive.

Figure 5:
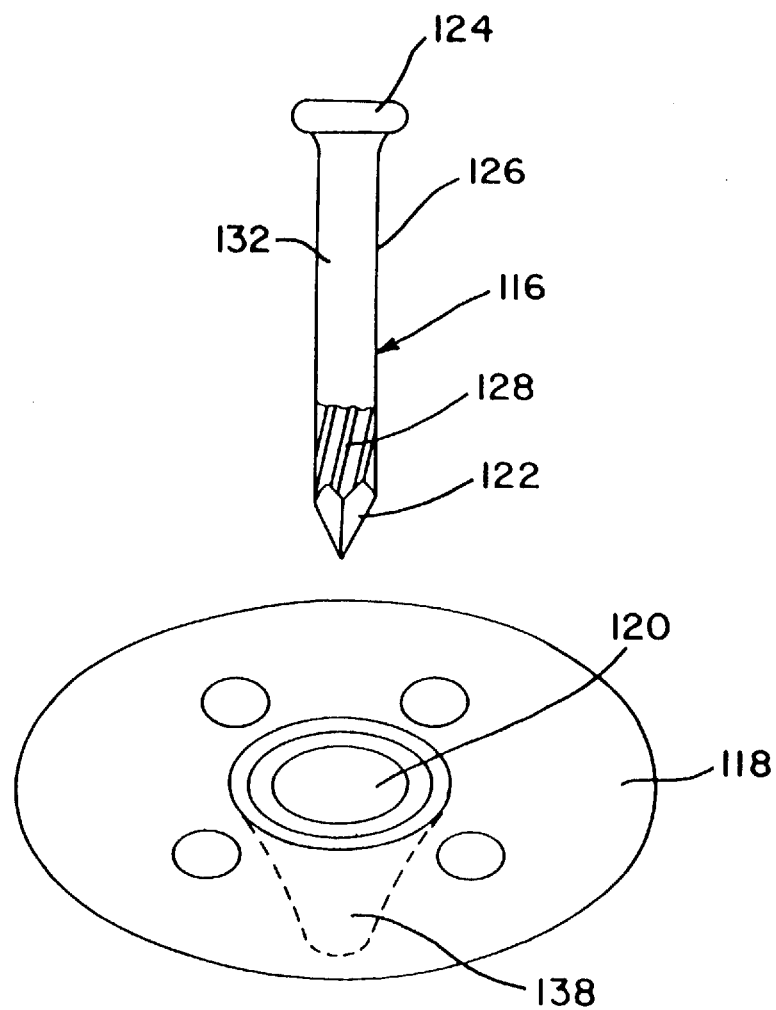
FIG. 5 is a perspective view of the depth-insensitive anchor bolt fastener shown in FIGS. 2–4 prior to assembly with a roofing washer or stress plate for use within the depth-insensitive concrete fastener system of FIG. 2.

More particularly, as can be seen and appreciated from FIG. 2, 3, and 5, the axial extent of the second ribbed shank portion 128 of the bolt fastener 116 is substantially less than the axial extent of the entire shank portion 126 of the bolt fastener 116, and preferably, the axial extent of the second ribbed shank portion 128 comprises only a fractional portion of the axial extent of the entire shank portion 126. More specifically, such fractional portion may be, for example, approximately one-sixth the length of the entire shank portion 126 of the bolt fastener 116. In addition, the axial extent of the second ribbed shank portion 128 must comprise only a fractional portion of the axial extent or depth of the pre-drilled hole or bore 134. Consequently, once the anchor bolt member 116 is drivingly impacted and inserted into the pre-drilled bore or hole 134 of the concrete decking 114 such that the second ribbed shank portion 128 of the anchor bolt member 116 is entirely enveloped by the surrounding sidewalls 136 of the decking 114 defining hole or bore 134, further axial insertion penetration of the bolt member 116 into the hole or bore 134 does not further increase driving or insertion resistance forces or the required force of installation. Such force of installation, or the driving or insertion resistance force, is limited by or is a function of the axial extent of the second ribbed shank portion 128 of the bolt member 116, and therefore, the anchor bolt member 116, and the fastener system 110 incorporating such bolt member 116, is effectively depth-insensitive. This is seen to be in marked contrast to the depth-sensitive characteristics of the bolt member 16 and the system 10 of the PRIOR ART as illustrated in FIG. 1. In accordance with the system of FIG. 1, as the bolt member 16 is progressively inserted or driven into the concrete decking 14, a correspondingly progressively increasing volume of the ribbed shank portion 28 of the anchor bolt 16 establishes a progressively increasing interference or friction fit with the pre-drilled hole or bore defined within the concrete substrate 14 whereby the required or encountered force of installation is correspondingly increased thereby rendering the installation harder and harder as the submerged depth of the anchor bolt 16 within the decking 14 increases.

In accordance then with the system 110 of the present invention, the required insertion or installation force is limited or maxed-out once the second ribbed shank portion 128 of the anchor bolt 116 is entirely inserted or submerged within the hole or bore 134 of the concrete decking 114, and this limitation of the insertion or installation force can be optimally or selectively controlled, minimized, or the like, by selectively varying or predetermining the axial extent of the second ribbed shank portion 128 as defined upon a particular or specific anchor bolt fastener 116 depending upon particular jobsite operational parameters or requirements The axial extent of the second ribbed shank portion 128 of the bolt fastener 116 also, of course, determines the pull-out resistance characteristics which the fastener 116 will exhibit under operational conditions. Therefore, depending upon the particular parameters, environment, or requirements of a particular jobsite, fastening operation, or the like, the specific or predetermined length of the second ribbed shank portion 128 of the anchor bolt member 116 can be selectively varied in order to selectively or optimally control, limit, or minimize the installation force required to drivingly install the anchor bolt fastener within the pre-drilled hole or bore formed within the concrete decking while concomitantly selectively or optimally determining the pull-out resistance characteristics of the concrete anchor fastener. In other words, a predeterminedly balanced system can be selected or developed with respect to the desired or required installation forces versus pull-out resistance values by properly choosing an appropriate axial extent value for the second ribbed shank portion 128 upon the concrete anchor member 116.

Figure 7:
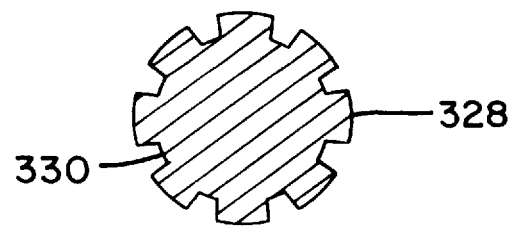
FIG. 7 is a view similar to that of FIG. 4 showing, however, a fastener shank portion wherein the ribbed portions thereof have a substantially square-shaped cross-sectional configuration.
Figure 6:
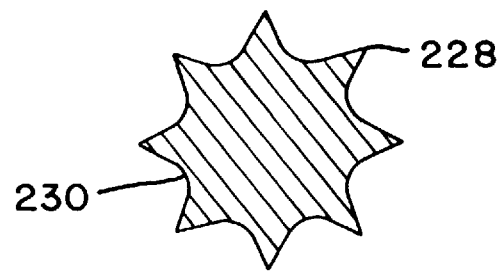
FIG. 6 is a view similar to that of FIG. 4 showing, however, a fastener shank portion wherein the ribbed portions thereof have substantially triangular cross-sectional configuration.

While it has been noted that the ribs 128 of the shank portion 126 of the concrete anchor member 116 can be axially aligned with respect to the longitudinal axis L of the concrete anchor member 116, it is preferred that the ribs 128 actually be angularly offset with respect to the longitudinal axis L by means of a predetermined angle A. This angle A can vary between, for example, 0° and 45°, with an angle of 5° of being preferred, the angle A being illustrated in FIG. 3. If the angle A is greater than 45°, it will be quite difficult to drive the anchor 116 into the concrete substrate. Alternatively, the ribs 128 may have a slightly twisted or spiralled orientation with respect to the longitudinal axis L of the concrete anchor fastener 116. It is further noted that as clearly seen from the cross-sectional view of FIG. 4, the cross-sectional configuration of each rib member 128 of the concrete anchor fastener 116 comprises a rounded lobe, however, alternative configurations are possible, such as, for example, wherein each rib member 128 may have a substantially square or triangular cross-sectional configuration as respectively illustrated at 228 and 328, along with alternating grooves 230 and 330, in FIGS. 6 and 7. However, the rounded configuration is preferred in view of the fact that each rib member 128 would then present a greater surface area of engagement with respect to the internal peripheral wall surfaces 136 of the hole or bore 134. In addition, such rounded surfaces tend to compress the concrete sidewalls 136 as opposed to scraping or cutting the same, resulting in greater pull-out resistance values. The angular orientation of the ribs 128 with respect to the longitudinal axis L also increases the pull-out resistance of the anchor with respect to an anchor wherein the ribs 128 are aligned with the longitudinal axis L. Still further, while the anchor has been illustrated with eight (8) ribs 128 disposed about the periphery thereof as seen in FIG. 4, the number of ribs can vary. For example, the number of ribs 128 may be six (6) or seven (7), and while it has been observed that such variation in the number of ribs 128 has substantially no effect upon the insertion force required to install the anchor 116 within the concrete substrate or substructure, the pull-out resistance will vary with test results indicating the largest pull-out resistance being achieved when seven (7) ribs 128 were employed.

As a last feature characteristic of the present invention and with reference being made again to FIG. 5, it is desirable to provide the anchor fastener 116 and the roofing washer or plate 118 as a two-piece pre-assembled component. In particular, a central undersurface portion 138 of the roofing washer 118 has a frustoconical configuration and is integrally formed with the washer 118 so as to depend downwardly therefrom. The distal end of the portion 138 is provided with an aperture, not shown, through which the anchor fastener 116 passes, and the internal diameter of such aperture is slightly larger than the diametrical extent $D_1$ of the first smooth shank portion 132 of the fastener 116, and substantially corresponds to the diametrical extent of the aperture 120 formed within the substantially planar roofing washer 118. In this manner, the anchor fastener 116 can be axially moved with respect to the washer plate 118 without any difficulty whatever. However, the diametrical extent $D_2$ of the second ribbed shank portion 128 of the fastener 116, as well as the diametrical extent of the head portion 124 of the fastener 116, are substantially greater than the external diametrical extent $D_1$ of the first smooth shank portion 132 of the fastener 116 as well as the internal diameter of the aperture 120 and the aperture, not shown, formed within the frustoconical portion 138 of the washer 118. Consequently, the washer plate 118 is effectively captured upon the anchor fastener 116 as a result of the outer diametrical or peripheral portion of the head portion 124 of the fastener 116 encountering the annular wall portion of washer plate 118 surrounding aperture 120, and the upper axial end portions of the ribs 128 of the fastener 116 encountering the distal annular wall portion of frustoconical portion 138 of washer plate 118, during extreme axial positional movements of the washer plate 118 and the anchor fastener 116 with respect to each other. The pre-assembled component comprising the anchor fastener 116 and the washer plate 118 enables workmen to readily use such structures or components at the jobsite, as when installation of the anchor fasteners 116 into the concrete decking 114 is to be performed, without initially requiring assembly of the fasteners 116 and the roofing washers 118.

Thus, it may be seen that the present invention has provided a new and improved depth-insensitive concrete fastener system which is especially adapted for use in connection with the securement or fastening of roofing insulation or membrane materials to concrete roofing decking. In particular, the new and improved depth-insensitive concrete fastener system incorporates therein an anchor device or member which establishes an interference or friction fit with interior sidewall portions of a hole or bore pre-drilled within the concrete roofing decking only along a predetermined limited axial extent of the anchor device or fastener such that the anchor fastener is effectively rendered depth-insensitive with respect to the concrete roofing decking whereby, in turn, the entire concrete fastener system exhibits depth-insensitive characteristics. As a result of such depth-insensitivity, the installation force required to impactly drive the anchor fastener into the pre-drilled hole or bore of the concrete decking to its fullest extent has a maximum or limited value which does not increase further as the anchor fastener is driven further bore of t pre-drilled hole or bore of the concrete decking. Concomitantly, the pull-out resistance characteristics of the fastening system are likewise determined by the axial extent of the interference or friction fit defined between the anchor fastener and the interior sidewall portions of the hole or bore defined within the concrete decking, and even though the installation force is limited, the pull-out resistance values or characteristics are more than adequate or sufficient so as to reliably retain the roofing insulation or membrane materials in their secured or fastened state with respect tot eh underlying concrete decking.

It is obviously noted that various modifications and variations may be imparted to the depth-insensitive concrete fastener system of the present invention, in accordance with the above teachings, without departing from the basic principles of the invention, It is therefore to be understood that within the scope of the appended claims, the present invention may be practiced otherwise than as specifically described herein.

What is claimed as new and desired to be protected by Letters Patent, is:

1. A depth-insensitive concrete fastener system for fastening material objects to a concrete substructure, comprising:

a concrete substructure;

a bore-hole, having a predetermined diametrical extent, defined within said concrete substructure;

a material object disposed upon said concrete substructure; and anchor fastener means, comprising a tip portion, a head portion, and a shank portion, interconnecting said tip and head portions, for insertion within said bore-hole of said concrete substructure for securing said material object upon said concrete substructure;

said shank portion of said anchor fastener means being solid, formed from a material and as a structural component which is substantially non-deformable when driven into said bore-hole defined within said concrete substructure, and comprising a first portion commencing immediately adjacent to said head portion, extending axially toward said tip portion, and having a first predetermined diametrical extent which is less than said predetermined diametrical extent of said bore-hole defined within said concrete substructure; and a second ribbed portion interposed between said first shank portion and said tip portion and comprising a circumferential array of substantially axially extending rib means, which are integrally formed upon, and from said material comprising, said shank portion of said anchor fastener means, which have a second predetermined diametrical extent which is greater than said predetermined diametrical extent of said bore-hole defined within said concrete substructure, which have an axial extent which is only a fractional portion of the axial extent of said shank portion of said anchor fastener means, and which have a substantially uniform cross-sectional configuration throughout said axial extent thereof, for permitting axial insertion of said anchor fastener means within said bore-hole defined within said concrete substructure in a substantially linear, impact driven manner and with an interference fit defined between said substantially axially extending, uniformly cross-sectioned rib means of said anchor fastener means and said bore-hole defined within said concrete substructure only along said axial extent of said second ribbed portion of said anchor fastener means so as to render said anchor fastener means, and said concrete fastener system, depth-insensitive regardless of the depth to which said anchor fastener means is driven into said bore-hole defined within said concrete substructure.

2. The depth-insensitive concrete fastener system as set forth in claim 1, wherein:

said bore-hole has a predetermined axial depth; and said axial extent of said second ribbed portion of said shank portion of said anchor fastener means is only a fractional portion of said axial depth of said bore-hole defined within said concrete substructure.

3. The system as set forth in claim 1, wherein:

said tip portion of said anchor fastener means comprises a substantially pointed tip.

4. The system as set forth in claim 1, wherein:

said shank portion of said anchor fastener means comprises a longitudinal axis; and said substantially axially extending ribs are offset with respect to said longitudinal axis of said shank portion of said anchor fastener means by means of an angle of approximately five degrees (5°).

5. The system as set forth in claim 1, wherein:

each one of said plurality of ribs of said ribbed portion of said shank portion of said anchor fastener means has a substantially rounded-lobe cross-sectional configuration.

6. A depth-insensitive concrete fastener system for fastening roofing materials to a concrete roofing deck, comprising:

a concrete roofing deck;

a bore-hole, having a predetermined diametrical extent, defined within said concrete roofing deck;

roofing material disposed upon said concrete roofing deck so as to be fastened thereto; and anchor fastener means, comprising a tip portion, a head portion, and a shank portion, interconnecting said tip and head portions, for insertion through said roofing material and into said bore-hole defined within said concrete roofing deck for fastening said roofing material upon said concrete roofing deck;

said shank portion of said anchor fastener means being solid, formed from a material and as a structural component which is substantially non-deformable when driven into said bore-hole defined within said concrete roofing deck, and comprising a first portion commencing immediately adjacent to said head portion, extending axially toward said tip portion, and having a first predetermined diametrical extent which is less than said predetermined diametrical extent of said bore-hole defined within said concrete roofing deck; and a second ribbed portion interposed between said first shank portion and said tip portion and comprising a circumferential array of substantially axially extending rib means, which are integrally formed upon, and from said material comprising, said shank portion of said anchor fastener means, which have a second predetermined diametrical extent which is greater than said predetermined diametrical extent of said bore-hole defined within said concrete roofing deck, which have an axial extent which is only a fractional portion of the axial extent of said shank portion of said anchor fastener means, and which have a substantially uniform rounded lobe cross-sectional configuration throughout said axial extent thereof, for permitting axial insertion of said anchor fastener means within said bore-hole defined within said concrete roofing deck in a substantially linear, impact driven manner and with an interference fit defined between said substantially axially extending, uniformly geometrical cross-sectioned rib means of said anchor fastener means and said bore-hole defined within said concrete roofing deck only along said axial extent of said second ribbed portion of said anchor fastener means so as to render said anchor fastener means, and said concrete fastener system, depth-insensitive regardless of the depth to which said anchor fastener means is drivingly inserted into said bore-hole defined within said concrete roofing deck.

7. The system as set forth in claim 6, wherein:

said bore-hole has a predetermined axial depth; and said axial extent of said second ribbed portion of said shank portion of said anchor fastener means is only a fractional portion of said axial depth of said bore-hole defined within said concrete roofing deck.

8. The system as set forth in claim 6, wherein:

said tip portion of said anchor fastener means comprises a substantially pointed tip.

9. The system as set forth in claim 6, wherein:

said shank portion of said anchor fastener means comprises a longitudinal axis; and said substantially axially extending ribs are offset with respect to said longitudinal axis of said shank portion of said anchor fastener means by means of an angle of approximately five degrees (5°).

10. A system as set forth in claim 6, wherein:

said roofing material comprises a sheet of roofing insulation.

11. A depth-insensitive concrete fastener system for fastening roofing material to a concrete roofing deck, comprising:

a concrete roofing deck;

a bore-hole, having predetermined diametrical extent, defined said concrete roofing deck;

roofing material disposed upon said concrete roofing deck so as to be fastened thereto;

a washer plate disposed upon said roofing material; and anchor fastener means, comprising a tip portion, a head portion, and a shank portion, interconnecting said tip and head portions, for insertion through said washer plate and said roofing material and into said bore-hole defined within said concrete roofing deck for fastening said roofing material upon said concrete roofing deck;

said shank portion of said anchor fastener means being solid, formed from a material and as a structural component which is substantially non-deformable when driven into said bore-hole defined within said concrete roofing deck, and comprising a first portion commencing immediately adjacent to said head portion, extending axially toward said tip portion, and having a first predetermined diametrical extent which is less than said predetermined diametrical extent of said bore-hole defined within said concrete roofing deck; and a second ribbed portion interposed between said first shank portion and said tip portion and comprising a circumferential array of substantially axially extending rib means, which are integrally formed upon, and from said material comprising, said shank portion of said anchor fastener means, which have a second predetermined diametrical extent which is greater than said predetermined diametrical extent of said bore-hole defined within said concrete roofing deck, which have an axial extent which is only a fractional portion of the axial extent of said shank portion of said anchor fastener means, and which have a substantially uniform geometrical cross-sectional configuration throughout said axial extent thereof, for permitting axial insertion of said anchor fastener means within said bore-hole defined within said concrete roofing deck in a substantially linear, impact driven manner and with an interference fit defined between said substantially axially extending, uniformly geometrical cross-sectioned rib means of said anchor fastener means and said bore-hole defined within said concrete roofing deck only along said axial extent of said second ribbed portion of said anchor fastener means so as to render said anchor fastener means, and said concrete fastener system, depth-insensitive regardless of the depth to which said anchor fastener means is drivingly inserted into said bore-hole defined within said concrete roofing deck.

12. The system as set forth in claim 11, wherein:

each one of said plurality of ribs of said ribbed portion of said shank portion of said anchor fastener means has a substantially square-shaped cross-sectional configuration.

13. The system as set forth in claim 11 wherein:

said bore-hole has a predetermined axial depth; and said axial extent of said second ribbed portion of said shank portion of said anchor fastener means is only a fractional portion of said axial depth of said bore-hole defined within said concrete roofing deck.

14. The system as set forth in claim 11, wherein:

said tip portion of said anchor fastener means comprises a substantially pointed tip.

15. The system as set forth in claim 11, wherein:

said shank portion of said anchor fastener means comprises a longitudinal axis; and said substantially axially extending ribs are offset with respect to said longitudinal axis of said shank portion of said anchor fastener means by means of an angle of approximately five degrees (5°).

16. The system as set forth in claim 11, wherein:

each one of said plurality of ribs of said ribbed portion of said shank portion of said anchor fastener means has a substantially rounded-lobe cross-sectional configuration.

17. The system as set forth in claim 11, wherein:

said roofing material comprises a sheet of roofing insulation.

18. The system as set forth in claim 11, wherein:

said washer plate and said anchor fastener means comprise a pre-assembled component.

19. The system as set forth in claim 18, wherein:

said washer plate has an aperture defined therethrough having a diametrical extent which is greater than said first predetermined diametrical extent of said first portion of said shank portion of said anchor fastener means, but which is less than the diametrical extent of said head portion of said anchor fastener means, and is also less than said second predetermined diametrical extent of said second ribbed portion of said shank portion of said anchor fastener means, such that while said washer plate may freely move axially with respect to said anchor fastener means and along said first portion of said shank portion of said anchor fastener means, said washer plate is captured upon said first portion of said shank, portion of said anchor fastener means between said head portion of said anchor fastener means and said second ribbed portion of said shank portion of said anchor fastener means.

20. The system as set forth in claim 11, wherein:

said washer plate is fabricated from metal and has a substantially square configuration.

21. The system as set forth in claim 11, wherein:

said washer plate is fabricated from a plastic material and has a substantially circular configuration.

22. The system as set forth in claim 11, wherein:

each one of said plurality of ribs of said ribbed portion of said shank portion of said anchor fastener means has a substantially triangular cross-sectional configuration.

* * * * *